(12) United States Patent
Sugiyama et al.

(10) Patent No.: US 10,787,570 B2
(45) Date of Patent: Sep. 29, 2020

(54) AROMATIC POLYESTER, LIQUID AROMATIC-POLYESTER COMPOSITION, PROCESS FOR PRODUCING AROMATIC-POLYESTER FILM, AND AROMATIC-POLYESTER FILM

(71) Applicant: Sumitomo Chemical Company, Limited, Tokyo (JP)

(72) Inventors: Takayuki Sugiyama, Tsukuba (JP); Toyonari Ito, Tokyo (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/757,847

(22) PCT Filed: Sep. 5, 2016

(86) PCT No.: PCT/JP2016/075975
§ 371 (c)(1),
(2) Date: Mar. 6, 2018

(87) PCT Pub. No.: WO2017/043439
PCT Pub. Date: Mar. 16, 2017

(65) Prior Publication Data
US 2018/0355171 A1     Dec. 13, 2018

(30) Foreign Application Priority Data
Sep. 9, 2015  (JP) .................. 2015-177737

(51) Int. Cl.
*C08L 77/12* (2006.01)
*C08J 5/18* (2006.01)
*C08G 69/44* (2006.01)
*C08G 69/32* (2006.01)
*C09D 177/12* (2006.01)
*C08L 67/03* (2006.01)

(52) U.S. Cl.
CPC .............. *C08L 77/12* (2013.01); *C08G 69/32* (2013.01); *C08G 69/44* (2013.01); *C08J 5/18* (2013.01); *C08L 67/03* (2013.01); *C09D 177/12* (2013.01); *C08L 2203/16* (2013.01)

(58) Field of Classification Search
CPC . C08G 69/32; C08G 69/44; C08J 5/18; C08L 2203/16; C08L 67/03; C08L 77/12; C09D 177/12
See application file for complete search history.

(56) References Cited

U.S. PATENT DOCUMENTS

| 4,277,131 A | * | 7/1981 | Hart .................... F23M 11/042 356/439 |
| 4,330,457 A | * | 5/1982 | East ...................... C08G 69/44 524/602 |
| 4,355,132 A | * | 10/1982 | East ...................... C08G 69/44 524/602 |
| 4,722,993 A | | 2/1988 | Hisgen et al. |
| 2002/0055607 A1 | | 5/2002 | Okamoto et al. |
| 2002/0143135 A1 | | 10/2002 | Okamoto et al. |
| 2004/0210032 A1 | | 10/2004 | Okamoto et al. |
| 2012/0248375 A1 | * | 10/2012 | Uehara ................. C08G 69/44 252/299.62 |
| 2014/0231714 A1 | * | 8/2014 | Komatsu ................ B29C 70/58 252/478 |

FOREIGN PATENT DOCUMENTS

| JP | S62132926 A | | 6/1987 |
| JP | 2002146003 A | | 5/2002 |
| JP | 2002220444 A | | 8/2002 |
| JP | 2004315678 A | | 11/2004 |
| JP | 2006-199769 | * | 8/2006 |
| JP | 2006199769 A | | 8/2006 |
| JP | 2012514066 A | | 6/2012 |
| JP | 2012530793 A | | 12/2012 |
| WO | 2010147378 A2 | | 12/2010 |

OTHER PUBLICATIONS

Extended European Search Report dated May 22, 2019 in EP Application No. 16844300.0.
Search Report dated Nov. 15, 2016 in Int'l Application No. PCT/JP2016/075975.
Office Action dated Nov. 12, 2019 in CN Application No. 201680051592.7.
Office Action dated Jul. 8, 2020 in CN Application No. 201680051592.7 (with English Machine Translation).

* cited by examiner

*Primary Examiner* — Ling Siu Choi
*Assistant Examiner* — Gennadiy Mesh
(74) *Attorney, Agent, or Firm* — Panitch Schwarze Belisario & Nadel LLP

(57) ABSTRACT

ABSTRACT OF THE DISCLOSURE

An aromatic polyester containing a repeating unit (A) having Formula (a) below; a repeating unit (B) derived from an aromatic dicarboxylic acid, such as terephalic acid; a repeating unit (C) derived from an aromatic amine optionally having a hydroxyl group; and a repeating unit (D) derived from an aromatic diol. The content of (A) is 10 mol % to <20 mol %, the content of (B) is 40 mol % to <45 mol %, the total content of (C) and (D) is 40 mol % to <45 mol %, and the content of (D) is >0 mol % and <15 mol % with respect to a total of (A) to (D). In the Formula (a), $Ar^1$ is a 1,4-phenylene group, a 2,6-naphthylene group, or a 4,4'-biphenylene group; and at least one hydrogen atom in AO may be each substituted with a halogen atom, an alkyl group, or an aryl group.

$$—O—Ar^1—CO—\qquad (a)$$

13 Claims, 1 Drawing Sheet

AROMATIC POLYESTER, LIQUID AROMATIC-POLYESTER COMPOSITION, PROCESS FOR PRODUCING AROMATIC-POLYESTER FILM, AND AROMATIC-POLYESTER FILM

CROSS-REFERENCE TO RELATED APPLICATION

This application is a Section 371 of International Application No. PCT/JP2016/075975, filed Sep. 5, 2016, which was published in the Japanese language on Mar. 16, 2017, under International Publication No. WO 2017/043439 A1, which claims priority under 35 U.S.C. § 119(b) to Japanese Application No. 2015-177737, filed Sep. 9, 2015, the disclosures of which are incorporated herein by reference in their entirety.

TECHNICAL FIELD

The present invention relates to an aromatic polyester, a liquid aromatic-polyester composition, a process for producing an aromatic-polyester film, and an aromatic-polyester film.

Priority is claimed on Japanese Patent Application No. 2015-177737, filed on Sep. 9, 2015, the content of which is incorporated herein by reference.

BACKGROUND ART

Since aromatic polyesters exhibit excellent high-frequency characteristics and low hygroscopicity, the application thereof as a film material for electronic substrates and the like is being studied.

For example, Patent Document 1 discloses an aromatic polyester including predetermined amounts of a repeating unit (A) derived from an aromatic hydroxycarboxylic acid, a repeating unit (B) derived from an aromatic dicarboxylic acid, and a repeating unit (C) derived from an aromatic amine selected from aromatic diamines and aromatic amines having a hydroxyl group, a liquid aromatic-polyester composition including the aromatic polyester and an aprotic solvent such as N-methylpyrrolidone, and a process for producing an aromatic-polyester film by casting the liquid composition on a support substrate and removing the solvent.

CITATION LIST

Patent Literature

[Patent Document 1] Japanese Unexamined Patent Application, First Publication No. 2004-315678

SUMMARY OF INVENTION

Technical Problem

However, films produced from the aromatic polyester described in Patent Document 1 described above still have room for improvement in terms of film elongation, thermal conductivity, and the like.

The present invention was made in view of the above circumstances and has an object of providing an aromatic polyester capable of forming a film excellent in film elongation and thermal conductivity, a liquid aromatic-polyester composition including the aromatic polyester, a process for producing an aromatic-polyester film, and an aromatic-polyester film.

Solution to Problem

A first aspect of the present invention is an aromatic polyester including, as constituent units, a repeating unit (A) represented by Formula (a) below; a repeating unit (B) derived from an aromatic dicarboxylic acid; a repeating unit (C) derived from an aromatic amine selected from the group consisting of aromatic diamines and aromatic amines having a hydroxyl group; and a repeating unit (D) derived from an aromatic diol, in which a content of the repeating unit (A) is 10 mol % or more and less than 20 mol %, a content of the repeating unit (B) is more than 40 mol % and 45 mol % or less, a total content of the repeating unit (C) and the repeating unit (D) is more than 40 mol % and 45 mol % or less, and a content of the repeating unit (D) is more than 0 mol % and less than 15 mol % with respect to a total of the repeating units (A) to (D).

(a)

(in the formula, $Ar^1$ represents a 1,4-phenylene group, a 2,6-naphthylene group, or a 4,4'-biphenylene group; at least one hydrogen atom of the group represented by $Ar^1$ may be each independently substituted with a halogen atom, an alkyl group, or an aryl group)

A second aspect of the present invention is a liquid aromatic-polyester composition including the aromatic polyester according to the first aspect of the present invention; and an aprotic solvent.

A third aspect of the present invention is a process for producing an aromatic-polyester film, the method including a step of coating the liquid aromatic-polyester composition according to the second aspect of the present invention onto a support substrate; and a step of removing a solvent from the liquid aromatic-polyester composition on the support substrate.

A fourth aspect of the present invention is an aromatic-polyester film including the aromatic polyester of the first aspect of the present invention.

That is, the present invention includes the following aspects.

[1] An aromatic polyester including, as constituent units, a repeating unit (A) represented by Formula (a) below; a repeating unit (B) derived from an aromatic dicarboxylic acid; a repeating unit (C) derived from an aromatic amine selected from the group consisting of aromatic diamines and aromatic amines having a hydroxyl group; and a repeating unit (D) derived from an aromatic diol; in which a content of the repeating unit (A) is 10 mol % or more and less than 20 mol %, a content of the repeating unit (B) is more than 40 mol % and 45 mol % or less, a total content of the repeating unit (C) and the repeating unit (D) is more than 40 mol % and 45 mol % or less, and a content of the repeating unit (D) is more than 0 mol % and less than 15 mol % with respect to a total of the repeating units (A) to (D).

(a)

(in the formula, $Ar^1$ represents a 1,4-phenylene group, a 2,6-naphthylene group, or a 4,4'-biphenylene group; at least one hydrogen atom of the group represented by $Ar^1$ may be each independently substituted with a halogen atom, an alkyl group, or an aryl group)

[2] The aromatic polyester according to [1], in which $Ar^1$ in Formula (a) is a 1,4-phenylene group or a 2,6-naphthylene group.

[3] The aromatic polyester according to [1] or [2], in which the repeating unit (B) is a repeating unit represented by Formula (b) below.

$$—CO—Ar^2—CO— \qquad (b)$$

(in the formula, $Ar^2$ represents a 1,4-phenylene group, a 1,3-phenylene group, a 2,6-naphthylene group, or a diphenyl ether-4,4'-diyl group; at least one hydrogen atom of the group represented by $Ar^2$ may be each independently substituted with a halogen atom, an alkyl group, or an aryl group)

[4] The aromatic polyester according to [3], in which $Ar^2$ in Formula (b) is a 1,4-phenylene group, a 1,3-phenylene group, or a 2,6-naphthylene group.

[5] The aromatic polyester according to any one of [1] to [4], in which the repeating unit (C) is a repeating unit represented by Formula (c) below.

$$—X—Ar^3—NH— \qquad (c)$$

(in the formula, $Ar^3$ represents a 1,4-phenylene group, a 1,3-phenylene group, or a 2,6-naphthylene group; at least one hydrogen atom of the group represented by $Ar^3$ may be each independently substituted with a halogen atom, an alkyl group, or an aryl group; and X represents —O— or —NH—)

[6] The aromatic polyester according to [5], in which $Ar^3$ in Formula (c) is an unsubstituted 1,4-phenylene group, an unsubstituted 1,3-phenylene group, or an unsubstituted 2,6-naphthylene group.

[7] The aromatic polyester according to any one of [1] to [6], in which the repeating unit (D) is a repeating unit represented by Formula (d) below.

$$—O—Ar^4—O— \qquad (d)$$

($Ar^4$ represents a 1,4-phenylene group, a 1,3-phenylene group, or a 4,4'-biphenylene group; at least one hydrogen atom of the group represented by $Ar^4$ may be each independently substituted with a halogen atom, an alkyl group, or an aryl group)

[8] The aromatic polyester according to [7], in which $Ar^4$ in Formula (d) is an unsubstituted 1,4-phenylene group, an unsubstituted 1,3-phenylene group, or an unsubstituted 4,4'-biphenylene group.

[9] An aromatic-polyester film including the aromatic polyester according to any one of [1] to [8].

[10] A liquid aromatic-polyester composition including the aromatic polyester according to any one of [1] to [8] and an aprotic solvent.

[11] The liquid aromatic-polyester composition according to [10], in which the aromatic polyester is contained in an amount of 0.01 parts by mass or more and 100 parts by mass or less with respect to 100 parts by mass of the aprotic solvent.

[12] The liquid aromatic-polyester composition according to [10] or [11], in which the aprotic solvent is an aprotic solvent not including a halogen atom.

[13] The liquid aromatic-polyester composition according to any one of [10] to [12], in which the aprotic solvent has a dipole moment of 3 or more and 5 or less.

[14] A process for producing an aromatic-polyester film, the method including a step of casting the liquid aromatic-polyester composition according to any one of [10] to [13] onto a support substrate; and a step of removing a solvent from the liquid aromatic-polyester composition on the support substrate.

Advantageous Effects of Invention

According to the present invention, it is possible to provide an aromatic polyester capable of forming a film excellent in film elongation and thermal conductivity, a liquid aromatic-polyester composition using the aromatic polyester, a process for producing an aromatic-polyester film, and an aromatic-polyester film.

DESCRIPTION OF EMBODIMENTS

<Aromatic Polyester>

Figure 1:
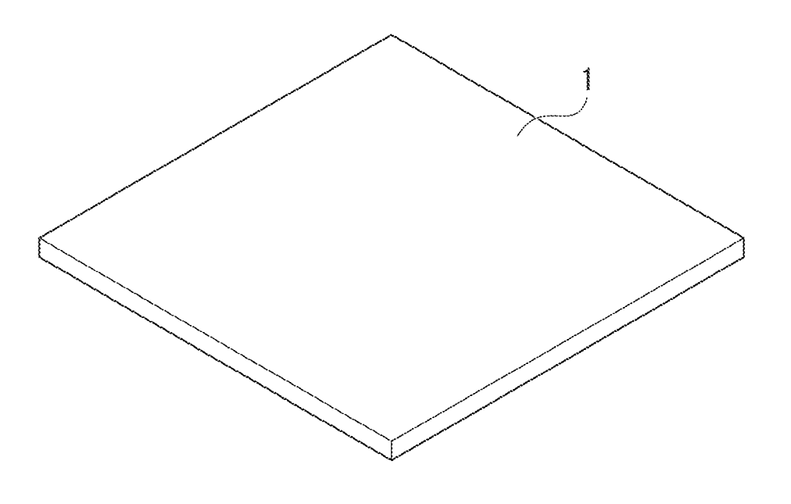
FIG. 1 is a perspective view showing an aromatic polyester which is an embodiment of the present invention.

It is possible to suitably use the aromatic polyester according to the first aspect of the present invention as a film material for an electronic substrate or the like.

The aromatic polyester, which is one embodiment of the present invention, is an aromatic polyester including, as constituent units, a repeating unit (A) represented by Formula (a) below (also referred to below as a repeating unit (A) or (A) repeating unit), a repeating unit (B) derived from an aromatic dicarboxylic acid (also referred to below as a repeating unit (B) or (B) repeating unit), a repeating unit (C) derived from an aromatic amine selected from the group consisting of aromatic diamines and aromatic amines having a hydroxyl group (also referred to below as a repeating unit (C) or (C) repeating unit), and a repeating unit (D) derived from an aromatic diol (also referred to below as a repeating unit (D) or (D) repeating unit), in which a content of the repeating unit (A) is 10 mol % or more and less than 20 mol %, a content of the repeating unit (B) is more than 40 mol % and 45 mol % or less, a total content of the repeating unit (C) and the repeating unit (D) is more than 40 mol % and 45 mol % or less, and a content of the repeating unit (D) is more than 0 mol % and less than 15 mol % with respect to a total of the repeating units (A) to (D)

$$—O—Ar^1—CO— \qquad (a)$$

(in the formula, $Ar^1$ represents a 1,4-phenylene group, a 2,6-naphthylene group, or a 4,4'-biphenylene group; at least one hydrogen atom of the group represented by $Ar^1$ may be each independently substituted with a halogen atom, an alkyl group, or an aryl group.)

In the aromatic polyester, the total of the repeating units (A) to (D) does not exceed 100 mol %. In the present specification, "derived" means that the chemical structure is changed due to polymerization.

(Repeating Unit (A))

The repeating unit (A) is represented by Formula (a) below.

$$—O—Ar^1—CO— \qquad (a)$$

(in the formula, $Ar^1$ represents a 1,4-phenylene group, a 2,6-naphthylene group, or a 4,4'-biphenylene group; at least one hydrogen atom of the group represented by $Ar^1$ may be each independently substituted with a halogen atom, an alkyl group, or an aryl group.)

$Ar^1$ in Formula (a) is preferably a 1,4-phenylene group, a 2,6-naphthylene group, or a 4,4'-biphenylene group. As $Ar^1$, a 1,4-phenylene group or a 2,6-naphthylene group is more preferable.

Examples of the repeating unit (A) include repeating units derived from p-hydroxybenzoic acid, repeating units derived from 2-hydroxy-6-naphthoic acid, repeating units derived from 4-hydroxy-4'-biphenylcarboxylic acid, and the like. Among these, a repeating unit derived from p-hydroxybenzoic acid or a repeating unit derived from 2-hydroxy-6-naphthoic acid is preferable.

(Repeating Unit (B))

The repeating unit (B) is a repeating unit derived from an aromatic dicarboxylic acid.

Examples of the repeating unit (B) include repeating units derived from at least one aromatic dicarboxylic acid selected from the group consisting of terephthalic acid, isophthalic acid, diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid, diphenyl ether-4,4'-dicarboxylic acid, orthophthalic acid, 2,6-naphthalenedicarboxylic acid, diphenic acid, and bis(p-carboxyphenyl) alkane. Among these, in view of high versatility, at least one repeating unit selected from the group consisting of a repeating unit derived from terephthalic acid and a repeating unit derived from isophthalic acid is preferable, and a repeating unit derived from isophthalic acid is more preferable. The repeating unit (B) is preferably a repeating unit represented by Formula (b) below.

$$—CO—Ar^2—CO— \quad (b)$$

(in the formula, $Ar^2$ represents a 1,4-phenylene group, a 1,3-phenylene group, a 2,6-naphthylene group, or a diphenyl ether-4,4'-diyl group; at least one hydrogen atom of the group represented by $Ar^2$ may be each independently substituted with a halogen atom, an alkyl group, or an aryl group.)

$Ar^2$ in Formula (b) is preferably a 1,4-phenylene group, a 1,3-phenylene group, or a 2,6-naphthylene group.

As the repeating unit (B), a repeating unit in which $Ar^2$ is 1,4-phenylene (that is, repeating units derived from terephthalic acid), a repeating unit in which $Ar^2$ is 1,3-phenylene (that is, repeating units derived from isophthalic acid), a repeating unit in which $Ar^2$ is 2,6-naphthylene (that is, repeating units derived from 2,6-naphthalenedicarboxylic acid), and a repeating unit in which $Ar^2$ is diphenyl ether-4,4'-diyl (that is, repeating units derived from diphenyl ether-4,4'-dicarboxylic acid) are preferable.

(Repeating Unit (C))

The repeating unit (C) is a repeating unit derived from an aromatic amine selected from the group consisting of aromatic diamines and aromatic amines having a hydroxyl group. The repeating unit (C) is preferably a repeating unit represented by Formula (c) below.

$$—X—Ar^3—NH— \quad (c)$$

(in the formula, $Ar^3$ represents a 1,4-phenylene group, a 1,3-phenylene group, or a 2,6-naphthylene group; at least one hydrogen atom of the group represented by $Ar^3$ may be each independently substituted with a halogen atom, an alkyl group, or an aryl group; and X represents —O— or —NH—.)

$Ar^3$ in Formula (c) is preferably an unsubstituted 1,4-phenylene group, 1,3-phenylene group, or 2,6-naphthylene group.

Examples of the repeating unit (C) include repeating units derived from 3-aminophenol, repeating units derived from 4-aminophenol, repeating units derived from 1,4-phenylenediamine, repeating units derived from 1,3-phenylenediamine, and the like. Among these, a repeating unit derived from 4-aminophenol is preferable.

At least one hydrogen atom of the groups represented by $Ar^1$, $Ar^2$ and $Ar^3$ may be each independently substituted with a halogen atom, an alkyl group, or an aryl group.

Examples of the halogen atom include a fluorine atom, a chlorine atom, a bromine atom, and an iodine atom.

The alkyl group is preferably an alkyl group having 1 to 10 carbon atoms, and examples thereof include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, a 2-ethylhexyl group, an n-octyl group, an n-nonyl group, and an n-decyl group.

The aryl group is preferably an aryl group having 6 to 20 carbon atoms, and examples thereof include a phenyl group, an o-tolyl group, an m-tolyl group, a p-tolyl group, a 1-naphthyl group, and a 2-naphthyl group.

In a case where the hydrogen atoms of the groups represented by $Ar^1$, $Ar^2$ and $Ar^3$ are substituted with these groups, the number thereof is preferably 2 or less for each group independently, and more preferably 1.

(Repeating Unit (D))

The repeating unit (D) is a repeating unit derived from an aromatic diol. Examples of the repeating unit (D) include a repeating unit represented by Formula (d) below.

$$—O—Ar^4—O— \quad (d)$$

($Ar^4$ represents a 1,4-phenylene group, a 1,3-phenylene group, or a 4,4'-biphenylene group; at least one hydrogen atom of the group represented by $Ar^4$ may be each independently substituted with a halogen atom, an alkyl group, or an aryl group.)

$Ar^4$ in Formula (d) is preferably an unsubstituted 1,4-phenylene group, 1,3-phenylene group, or 4,4'-biphenylene group.

At least one hydrogen atom of the group represented by $Ar^4$ in Formula (d) may be independently substituted with a halogen atom, an alkyl group, or an aryl group.

Examples of the substituents include the same groups as the halogen atom, alkyl group, or aryl group described as the substituent which $Ar^1$, $Ar^2$ and $Ar^3$ may have.

Specific examples of the repeating unit (D) include a repeating unit derived from hydroquinone, repeating unit derived from a resorcinol, a repeating unit derived from 4,4'-biphenol, and the like. Among these, a repeating unit derived from hydroquinone is preferable.

The aromatic polyester as one embodiment of the present invention includes the repeating units (A) to (D) as described above, and in the composition thereof, a content of the repeating unit (A) is 10 mol % or more and less than 20 mol %, a content of the repeating unit (B) is more than 40 mol % and 45 mol % or less, a total content of the repeating unit (C) and the repeating unit (D) is more than 40 mol % and 45 mol % or less, and a content of the repeating unit (D) is more than 0 mol % and less than 15 mol % with respect to a total of the repeating units (A) to (D).

The content of the repeating unit (A) is preferably 16 mol % or more and 19 mol % or less with respect to the total of the repeating units (A) to (D), and more preferably 16 mol % or more and 18 mol % or less.

The content of the repeating unit of (B) is preferably more than 40 mol % and 43 mol % or less with respect to the total of the repeating units (A) to (D), and more preferably 41 mol % or more and 42 mol % or less.

The content of the repeating units of (C) is preferably more than 25 mol % and 40 mol % or less with respect to the total of the repeating units (A) to (D), more preferably more than 28 mol % and 35 mol % or less, and even more preferably 29 mol % or more and 32 mol % or less.

The content of the repeating unit (D) is preferably 0.5 mol % or more and less than 15 mol % with respect to the total of the repeating units (A) to (D), and more preferably 10 mol % or more and 12 mol % or less. The total content of the repeating unit (C) and the repeating unit (D) is preferably more than 40 mol % and 43 mol % or less with respect to the total of the repeating units (A) to (D), and more preferably 41 mol % or more and 42 mol % or less.

In the present invention, when the content of the repeating unit (A) is 10 mol % or more with respect to the total of the repeating units (A) to (D), it is possible to suppress a sharp rise in viscosity at the time of production, which is preferable from the viewpoint of production. In addition, when the content of the repeating unit (A) is less than 20 mol % with respect to the total of the repeating units (A) to (D), the solubility in an aprotic solvent becomes good.

Furthermore, the content of the repeating unit (A) being within the predetermined range described above with respect to the total of the repeating units (A) to (D) makes it possible to increase the film elongation of the aromatic-polyester film including the aromatic polyester of the present invention. For this reason, when subjected to bending (bending process), cracks are not generated in the aromatic-polyester film including the aromatic polyester of the present invention or it is possible to greatly suppress the generation of cracks.

In addition to this, the content of the repeating unit (A) being within the predetermined range described above with respect to the total of the repeating units (A) to (D) makes it possible to increase the thermal conductivity of the aromatic-polyester film including an aromatic polyester of the present invention.

In the present invention, the content of the repeating unit (B) being within the range described above with respect to the total of the repeating units (A) to (D) makes it possible to contribute to the exhibition of flexibility of the aromatic-polyester film including the aromatic polyester of the present invention and to increase the film elongation of the film. For this reason, when subjected to bending (bending process), cracks are not generated in the aromatic-polyester film including the aromatic polyester of the present invention or it is possible to greatly suppress the generation of cracks.

In the present invention, the content of the repeating unit (B) is preferably substantially the same as the total content of the repeating unit (C) and the repeating unit (D). "Substantially the same" means that the content of the repeating unit (B) is within ±1 mol % with respect to the total content of the repeating unit (C) and the repeating unit (D). The content of the repeating unit (B) may be −10 mol % to +10 mol % with respect to the total content of the repeating unit (C) and the repeating unit (D). It is also possible to control the degree of polymerization of the aromatic polyester by changing the use ratio of the corresponding monomer within this range.

The repeating unit (D) is preferably used in the form of substituting a part of the repeating unit (C), and the substitution amount in this case is normally 0.01 or more and 0.75 or less in a case of substituting at the molar ratio (D)/(C) with respect to the originally used repeating unit (C) (that is, the content of the repeating unit (D)/the amount of the originally used repeating unit (C)), and preferably 0.02 or more and 0.65 or less.

In the present invention, when the content of the repeating unit (D) exceeds 0 mol % with respect to the total content of the repeating units (A) to (D), it is possible to suppress a sharp increase in viscosity at the time of production, which is preferable from the viewpoint of production, and, in addition, it is possible to increase the film elongation of the aromatic-polyester film including the aromatic polyester of the present invention. For this reason, when subjected to bending (bending process), cracks are not generated in the aromatic-polyester film including the aromatic polyester of the present invention or it is possible to greatly suppress the generation of cracks. In addition, the content of the repeating unit (D) being within the predetermined range described above with respect to the total of the repeating units (A) to (D) makes it possible to increase the thermal conductivity of the aromatic-polyester film including the aromatic polyester of the present invention.

The aromatic polyester in the present invention includes the repeating unit as described above, but as a process for producing the same, it is possible to carry out the production based on a normal method, for example, a method or the like described in JP-A 2002-220444, JP-A 2002-146003, and the like using a monomer corresponding to each repeating unit, that is, at least one derivative selected from the group consisting of aromatic hydroxycarboxylic acid, aromatic dicarboxylic acid, aromatic amine, aromatic diol, and the like or ester-forming derivatives and amide-forming derivatives thereof.

In addition, the mol % of each monomer to be used is the same as the mol % indicated in the repeating unit described above.

Here, examples of ester-forming derivatives and amide-forming derivatives of carboxylic acids in aromatic dicarboxylic acids, aromatic hydroxycarboxylic acids, and the like include derivatives in which the carboxylic acid structure is converted into a structure with high reaction activity and which promotes a reaction generating esters, amides, and the like, such as an acid halide structure and an acid anhydride structure, derivatives which generate esters through a transesterification reaction or amides through an amide exchange reaction, which are derivatives in which the carboxylic acid structure is converted into an ester structure with alcohols, ethylene glycol, or the like.

In addition, examples of ester-forming derivatives of phenolic hydroxyl groups in aromatic diol, aromatic hydroxycarboxylic acid, and aromatic amine (for example, aminophenol) and the like include derivatives which generate an ester through a transesterification reaction, which are derivatives in which a phenolic hydroxyl group is converted to an ester structure with carboxylic acids having 1 to 5 carbon atoms.

Examples of amide-forming derivatives of amino groups in aromatic amines such as aromatic diamines and aminophenols include derivatives which generate amides through an amide exchange reaction, which are derivatives in which an amino group is converted into an amide with carboxylic acids having 1 to 5 carbon atoms.

Representative methods for producing the aromatic polyester in the present invention include a melt polymerization method in which phenolic hydroxyl groups and amino groups such as aromatic hydroxycarboxylic acid, aminophenol, aromatic diamine, and aromatic diol are acylated with an excess amount of fatty acid anhydride to obtain an acylated product, and polycondensation is carried out by transesterification or amide exchange reaction between the obtained acylated product and a carboxyl group such as an aromatic dicarboxylic acid or an aromatic hydroxycarboxylic acid.

Here, in the acylation reaction, the addition amount of the fatty acid anhydride is usually 1.0 to 1.2 times the equivalent with respect to the total of the phenolic hydroxyl group and the amino group, and preferably 1.05 to 1.1 times the equivalent. When the addition amount of the fatty acid anhydride is less than 1.0 times the equivalent, there is a tendency for the acylated product, the raw material monomer, and the like to sublime at the time of polycondensation and for the reaction system to easily become clogged, in addition, in a case where the addition amount exceeds 1.2 times the equivalent, the obtained aromatic polyester tends to be colored. That is, when the addition amount of the fatty acid anhydride is within the range described above, it is possible to suppress sublimation of the acylated compound, the raw material monomer, and the like at the time of polycondensation, the reaction system does not easily become clogged, and the obtained aromatic polyester is not easily colored.

The acylation reaction is usually carried out at 130° C. to 180° C. for 5 minutes to 10 hours, and preferably carried out at 140° C. to 160° C. for 10 minutes to 3 hours.

The fatty acid anhydride used in the acylation reaction is not particularly limited, but examples thereof include acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, and the like, and one or more kinds thereof may be used. From the viewpoints of price and the handling property, at least one selected from the group consisting of acetic anhydride, propionic anhydride, butyric anhydride, and isobutyric anhydride is preferable, and acetic anhydride is more preferable.

In the transesterification and amide exchange reaction, it is preferable to adjust the carboxyl group to 0.8 to 1.2 times the equivalent with respect to the total amount of the acyl group and the amide group.

The transesterification and the amide exchange reaction are preferably carried out while raising the temperature at 130° C. to 400° C. at a rate of 0.1 to 50° C./min, and more preferably carried out while raising the temperature at 150° C. to 350° C. at a rate of 0.3 to 5° C./min. At this time, in order to move the equilibrium, the by-produced fatty acid and the unreacted fatty acid anhydride are preferably distilled out of the system by evaporating or the like.

The acylation reaction, the transesterification and the amide exchange reaction may be carried out in the presence of a catalyst.

As the catalyst, it is possible to use a catalyst known in the related art as a polymerization catalyst for polyester, and examples thereof include metal salt catalysts such as magnesium acetate, stannous acetate, tetrabutyl titanate, lead acetate, sodium acetate, potassium acetate, and antimony trioxide; organic compound catalysts such as N,N-dimethylaminopyridine and N-methylimidazole, and the like.

Among these catalysts, heterocyclic compounds including two or more nitrogen atoms such as N,N-dimethylaminopyridine and N-methylimidazole are preferably used (refer to Japanese Unexamined Patent Application, First Publication No. 2002-146003).

Polycondensation by transesterification and amide exchange reaction is usually carried out by melt polymerization, but melt polymerization and solid layer polymerization may be used in combination. Solid phase polymerization is preferably carried out by a known solid phase polymerization method after extracting the polymer from the melt polymerization step and then pulverizing the polymer into powder form or flake form. Specifically, examples thereof include a method in which heat treatment is performed in a solid phase at 180° C. to 350° C. for 1 to 30 hours under an inert atmosphere such as nitrogen, and the like. The solid-phase polymerization may be carried out with stirring or in a state of being left still without stirring. Providing an appropriate stirring mechanism also makes it possible to make the melt polymerization tank and the solid phase polymerization tank be the same reaction tank. After solid phase polymerization, the obtained aromatic polyester may be formed into pellets by a known method (for example, a method in which a resin strand prepared by a twin-screw kneading extruder is cut with a pelletizer).

It is possible to use both a batch apparatus and a continuous apparatus as an apparatus for producing an aromatic polyester.

In this manner, the aromatic polyester of the present invention is produced, but known fillers, additives, and the like may be blended in the aromatic polyester in a range in which the purpose of the present invention is not impaired.

Examples of fillers include organic fillers such as epoxy resin powder, melamine resin powder, urea resin powder, benzoguanamine resin powder, and styrene resin; inorganic fillers such as silica, alumina, titanium oxide, zirconia, kaolin, calcium carbonate, silicon carbide, calcium phosphate, and boron nitride, and the like.

Examples of additives include known coupling agents, anti-settling agents, ultraviolet absorbers, thermal stabilizers, and the like.

In addition, in a range in which the purpose of the present invention is not impaired, one or more kinds of polypropylene, polyamide, polyester, polyphenylene sulfide, polyether ketone, polycarbonate, polyether sulfone, polyphenyl ether, and modified products thereof; thermoplastic resins such as polyether imide; elastomers such as a copolymer of glycidyl methacrylate and polyethylene; and the like may be blended with the aromatic polyester.

In a case where these fillers are blended in the aromatic polyester of the present invention, the content of the filler is preferably greater than 0 parts by mass and 100 parts by mass or less when the aromatic polyester is 100 parts by mass.

<Liquid Aromatic-Polyester Composition>

The liquid aromatic-polyester composition according to the second aspect of the present invention is a liquid composition containing the aromatic polyester and the aprotic solvent as described above and it is possible to produce the liquid aromatic-polyester composition by mixing the two.

The content of the aromatic polyester in the liquid aromatic-polyester composition is preferably 0.01 parts by mass or more and 100 parts by mass or less when the content of the aprotic liquid is 100 parts by mass. When the content of the aromatic polyester is less than 0.01 parts by mass, the solution viscosity of the liquid composition tends to be excessively low such that uniform coating is not possible, and when the content exceeds 100 parts by mass, the liquid composition tends to increase in viscosity. That is, when the content of the aromatic polyester is within the above range, the solution viscosity of the liquid composition is not excessively low such that uniform coating is possible and, in addition, it is possible to suppress increases in the viscosity of the liquid composition.

From the viewpoint of workability and economy, the content of the aromatic polyester is preferably 1 part by mass or more and 50 parts by mass or less when the content of the aprotic liquid is 100 parts by mass, and more preferably 2 parts by mass or more and 40 parts by mass or less.

The viscosity of the liquid composition is preferably 500 cP or more and 10000 CP or less.

Examples of the aprotic solvent include halogenated solvents such as 1-chlorobutane, chlorobenzene, 1,1-dichloroethane, 1,2-dichloroethane, chloroform, and 1,1,2,2-tetrachloroethane; ether solvents such as diethyl ether, tetrahydrofuran, and 1,4-dioxane; ketone solvents such as acetone and cyclohexanone; ester solvents such as ethyl acetate; lactone solvents such as γ-butyrolactone; carbonate solvents such as ethylene carbonate and propylene carbonate; amine solvents such as triethyl amine and pyridine; nitrile solvents such as acetonitrile and succinonitrile; amide solvents such as N,N'-dimethylformamide, N,N'-dimethylacetamide, tetramethylurea, and N-methylpyrrolidone; nitro-based solvents such as nitromethane and nitrobenzene; sulfide-based solvents such as dimethyl sulfoxide and sulfolane; phosphoric acid-based solvents such as hexamethyl phosphoric acid amide and tri n-butyl phosphoric acid; and the like.

Among these, a solvent which does not include a halogen atom is preferably used from the viewpoint of environmental influence, and a solvent having a dipole moment of 3 or more and 5 or less is preferably used from the viewpoint of solubility.

Examples of compounds which are aprotic compounds and have a dipole moment of 3 to 5 include dimethylsulfoxide (dipole moment: 4.1 Debye), N,N-dimethylacetamide (dipole moment: 3.7 Debye), N,N-dimethylformamide (3.9 Debye), and N-methylpyrrolidone (dipole moment: 4.1 Debye).

The "dipole moment" is obtained by multiplying the absolute values of the positive and negative charges generated on each atom by the bond distances in the bonds between atoms, and is represented by a vector.

Here, the term "liquid composition" in the present specification means a composition in a liquid state at 20° C. to 40° C. In the liquid composition, the entirety of the aromatic polyester does not necessarily have to be dissolved, but having a smaller undissolved amount is preferable (for example, the undissolved amount is preferably 0.5% or less), and the entirety is more preferably dissolved.

<Process for Producing Aromatic-Polyester Film>

A description will be given of a process for producing an aromatic-polyester film according to a third aspect of the present invention. A process for producing an aromatic-polyester film of the present invention includes a step of casting the liquid aromatic-polyester composition as described above on a support substrate, and a step of removing a solvent from the liquid aromatic-polyester composition on the support substrate. The process for producing may further include a step of removing the support substrate after the step of removing the solvent.

As the support substrate, a polyethylene terephthalate (PET) film, a polyimide film, a glass plate, or a metal foil is preferable.

In the present invention, as necessary, fine foreign material included in the liquid aromatic-polyester composition is removed by filtering the liquid aromatic-polyester composition through a filter or the like, and then, surface planarization and uniform casting are carried out on the support substrate using various types of means such as, for example, a roller coating method, a dip coating method, a spray coating method, a spinner coating method, a curtain coating method, a slot coating method, a screen printing method, or the like.

The method for removing the aprotic solvent is not particularly limited, but a method of removing the aprotic solvent by evaporating the solvent is preferable, and examples thereof include a method of evaporating by any one of heating, depressurizing, and ventilating, or a combination of two or more thereof. Among these, from the viewpoints of production efficiency and the handling property, a method of evaporating the solvent by heating is preferable, and a method of evaporating the solvent while ventilating and heating is more preferable. Heating at this time is preferably carried out at 60° C. to 200° C. for 10 minutes to 2 hours and then heating is preferably carried out at 200° C. to 400° C. for 30 minutes to 5 hours in order to further increase the molecular weight of the aromatic polyester. Here, "removing the solvent" does not necessarily mean "remove the solvent entirely" and, for example, it is preferable to sufficiently remove the solvent to such an extent that there is no obvious change in the weight of the aromatic-polyester film. Here, "obvious weight change" means that the weight loss is 0.1% or less when left at 100° C. for 30 minutes.

<Aromatic-Polyester Film>

The aromatic-polyester film according to the fourth aspect of the present invention includes an aromatic polyester of the present invention, and is able to be produced by the process for producing described above, for example. The thickness of the aromatic-polyester film of the present invention is preferably from 0.5 to 500 μm from the viewpoint of film formability and mechanical properties, and more preferably from 1 to 200 μm from the viewpoint of the handling property.

Here, the "thickness" here is an average value of values obtained by measuring 5 to 10 arbitrary places at equal intervals using a micrometer device. The aromatic-polyester film of the present invention preferably has a thermal conductivity of 0.28 W/(m·K) or more and a tensile elongation at break of 20.0% or more when the thermal conductivity and the tensile elongation at break are measured by the methods described in the below Examples. In addition, since the aromatic-polyester film of the present invention not only has excellent properties such as good thermal conductivity and high film elongation, but also exhibits excellent characteristics such as high-frequency characteristics and low hygroscopicity, use is also possible in multilayer printed circuit boards, flexible printed wiring boards, and film for tape-automated bonding for semiconductor packages and mother boards made by the build-up method and the like attracting attention in recent years, as well as substrates for 8 mm video tape, substrates for commercial digital video tape, substrates for transparent conductive (ITO) films, substrates for polarizing films, packaging films for various cooking foods and microwave heating, electromagnetic wave-shielding films, antibacterial films, gas separation films, and the like.

<Metal Base Circuit Board>

A description will be given of a metal base circuit board using the aromatic-polyester film of the present invention.

It is possible for the metal base circuit board using the aromatic-polyester film of the present invention to have the same configuration as and to be produced with the same method as a known metal base circuit board except that the aromatic-polyester film is used as the insulating layer.

For example, it is possible to produce the metal base circuit board by producing a laminate provided with a metal layer on one side or both sides of an insulating layer formed of one sheet of the aromatic-polyester film or an insulating layer in which a plurality of sheets of the aromatic-polyester film are laminated, forming a predetermined circuit pattern on the metal layer of the laminate by etching or the like, and laminating the laminate on which the circuit pattern is formed as is or as two sheets or more as necessary. The metal base circuit board is preferably formed by laminating metal layers on both sides of an aromatic-polyester film.

In the case of an insulating layer in which a plurality of the aromatic-polyester films are laminated, all of the plurality of sheets of aromatic-polyester films may be the same, some may be the same, or all of them may be different. In addition, the number of sheets is not particularly limited as long as there are 2 sheets or more and, for example, 2 sheets or more to 10 sheets or less are preferable. It is possible to produce such an insulating layer, for example, by stacking a plurality of aromatic-polyester films on each other in the thickness direction, hot-pressing the films, fusing the films together, and integrating the films.

The material of the metal layer is preferably copper, aluminum, silver, or an alloy including at least one kind of metal selected from the above. Among these, copper or a copper alloy is preferable from the viewpoint of having better conductivity. The metal layer is preferably a layer made of a metal foil, and more preferably a layer made of a copper foil, from the viewpoint that the material is easily handled, it is possible to easily form the metal layer, and the material is excellent in terms of being economical. In a case where the metal layer is provided on both surfaces of the insulating layer, the material of these metal layers may be the same or different.

Examples of a method for providing the metal layer include a method of fusing a metal foil to a surface of an insulating layer, a method of bonding a metal foil to a surface of an insulating layer with an adhesive, or a method of covering a surface of an insulating layer with metal powder or metal particles by a plating method, a screen printing method, or a sputtering method.

In a case where the insulating layer is formed by laminating a plurality of the aromatic-polyester films, these aromatic-polyester films are arranged so as to overlap in the thickness direction thereof and a metal foil is further made to overlap on surfaces of one or both of the aromatic-polyester films located at the outermost sides, these metal foils and the plurality of aromatic-polyester films are subjected to hot-pressing, making it possible to provide the metal layer on one surface or both surfaces of the insulating layer at the same time when forming the insulating layer.

Another aspect of the aromatic polyester of the present invention is an aromatic polyester including, as constituent units, (A) at least one repeating unit selected from the group consisting of a repeating unit derived from p-hydroxybenzoic acid, a repeating unit derived from 2-hydroxy-6-naphthoic acid, and a repeating unit derived from 4-hydroxy-4'-biphenylcarboxylic acid, preferably, at least one repeating unit selected from the group consisting of a repeating unit derived from p-hydroxybenzoic acid and a repeating unit derived from 2-hydroxy-6-naphthoic acid, and more preferably, a repeating unit derived from 4-hydroxybenzoic acid;

(B) a repeating unit derived from at least one aromatic dicarboxylic acid selected from the group consisting of terephthalic acid, isophthalic acid, diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether 3,4'-dicarboxylic acid, diphenyl ether-4,4'-dicarboxylic acid, orthophthalic acid, 2,6-naphthalene dicarboxylic acid, diphenic acid, and bis(p-carboxyphenyl) alkane, preferably, at least one repeating unit selected from the group consisting of a repeating unit derived from terephthalic acid and a repeating unit derived from isophthalic acid, and more preferably, a repeating unit derived from isophthalic acid;

(C) at least one repeating unit selected from the group consisting of a repeating unit derived from 3-aminophenol, a repeating unit derived from 4-aminophenol, a repeating unit derived from 1,4-phenylenediamine, and a repeating unit derived from 1,3-phenylenediamine, preferably, a repeating unit derived from 4-aminophenol, and more preferably, a repeating unit derived from 4-hydroxyacetanilide;

(D) at least one repeating unit selected from the group consisting of a repeating unit derived from hydroquinone, a repeating unit derived from resorcin, and a repeating unit derived from 4,4'-biphenol, and preferably, a repeating unit derived from hydroquinone, in which, with respect to the total of the repeating units (A) to (D), the content of the repeating unit (A) is 10 mol % or more and less than 20 mol %, preferably 16 mol % or more and 19 mol % or less, and more preferably 16 mol % or more and 18 mol % or less;

the content of the repeating unit of (B) is more than 40 mol % and 45 mol % or less, preferably more than 40 mol % and 43 mol % or less, and more preferably 41 mol % or more and 42 mol % or less;

the total content of the repeating unit (C) and the repeating unit (D) is more than 40 mol % and 45 mol % or less, and preferably 41 mol % or more and 42 mol % or less;

the content of the repeating unit (D) is more than 0 mol % and less than 15 mol %, preferably 0.5 mol % or more and less than 15 mol %, and more preferably 10 mol % or more and 12 mol % or less; and the content of the repeating unit (C) is preferably more than 25 mol % and 40 mol % or less, more preferably more than 28 mol % and 35 mol % or less, and even more preferably 29 mol % or more and 32 mol % or less.

EXAMPLES

A more detailed description will be given below of the present invention with reference to Examples, but the present invention is not limited to the following Examples.

<Production of Aromatic Polyester>

Example 1

248.6 g (1.8 mol) of 4-hydroxybenzoic acid (abbreviated below as POB), 468.6 g (3.1 mol) of 4-hydroxyacetanilide (abbreviated below as APAP), 681.1 g (4.1 mol) of isophthalic acid (abbreviated below as IPA), 110.1 g (1.0 mol) of hydroquinone (abbreviated below as HQ), and 806.5 g (7.90 mol) of acetic anhydride were added to a reaction container equipped with a stirrer, a torque meter, a nitrogen gas inlet tube, a thermometer, and a reflux condenser. After sufficiently replacing the inside of the reaction container with nitrogen gas, the temperature was raised to 150° C. over 15 minutes in a nitrogen gas stream, and the temperature was maintained to carry out refluxing for 3 hours.

Thereafter, while distilling out by-produced acetic acid to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Example 2

221.0 g (1.6 mol) of POB, 483.7 g (3.2 mol) of APAP, 697.7 g (4.2 mol) of IPA, 110.1 g (1.0 mol) of HQ, and 796.3 g (7.80 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Example 3

248.6 g (1.8 mol) of POB, 438.4 g (2.9 mol) of APAP, 681.1 g (4.1 mol) of IPA, 132.1 g (1.2 mol) of HQ, and 826.9 g (8.10 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Example 4

221.0 g (1.6 mol) of POB, 453.5 g (3.0 mol) of APAP, 697.7 g (4.2 mol) of IPA, 132.1 g (1.2 mol) of HQ, and 816.7 g (8.00 mol) of acetic anhydride were added to a reaction container equipped with a stirrer, a torque meter, a nitrogen gas inlet tube, a thermometer, and a reflux condenser.

After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Example 5

234.8 g (1.7 mol) of POB, 476.2 g (3.15 mol) of APAP, 689.4 g (4.15 mol) of APA, 110.1 g (1.0 mol) of HQ, and 801.4 g (7.85 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Production Example 1

376.4 g (2.0 mol) of 2-hydroxy-6-naphthoic acid (abbreviated below as HNA), 604.6 g (4.0 mol) of APAP, 664.5 g (4.0 mol) of IPA, and 714.6 g (7.00 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Production Example 2

282.3 g (1.5 mol) of HNA, 642.4 g (4.25 mol) of APAP, 706.1 g (4.25 mol) of IPA, and 689.1 g (6.75 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Production Example 3

276.2 g (2.0 mol) of POB, 377.9 g (2.5 mol) of APAP, 664.5 g (4.0 mol) of IPA, 165.2 g (1.5 mol) of HQ, and 867.8 g (8.50 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

Production Example 4

248.6 g (1.8 mol) of POB, 362.8 g (2.4 mol) of APAP, 681.1 g (4.1 mol) of IPA, 187.2 g (1.7 mol) of HQ, and 878.0 g (8.60 mol) of acetic anhydride were added to a reaction container equipped with a stirrer, a torque meter, a nitrogen gas inlet tube, a thermometer, and a reflux condenser. After sufficiently substituting the inside of the reaction container with nitrogen gas, the temperature was raised to 150° C. over 15 minutes in a nitrogen gas stream, and the temperature was maintained to carry out refluxing for 3 hours.

Thereafter, while distilling out acetic acid by-product to be distilled and unreacted acetic anhydride, the temperature was raised to 300° C. over 300 minutes, and the point at which an increase in torque was observed was regarded as the end of the reaction and the contents were taken out. Next, this was cooled to room temperature, pulverized by a coarse pulverizer, then kept at 290° C. for 3 hours in a nitrogen atmosphere, and the polymerization reaction was carried out in a solid phase to obtain an aromatic polyester powder.

<Production of Aromatic-Polyester Film>

Example 6

50 g of the aromatic polyester powder obtained in Example 1 was added to 200 g of N-methylpyrrolidone and heated to 140° C. and, as a result, it was confirmed that the aromatic polyester powder was completely dissolved, and a transparent solution was obtained. This solution was stirred and defoamed to obtain an aromatic polyester solution. The obtained solution was bar-coated on a copper foil at a coating thickness of 200 μm and then heated at 50° C. for 2 hours using a hot air dryer to remove the solvent and further heat treated at 300° C. for 1 hour in a nitrogen atmosphere. When the copper foil was removed by etching from the obtained copper foil with resin, an aromatic-polyester film having a film thickness of 25 μm with sufficient strength was obtained.

Example 7

An aromatic-polyester film having a film thickness of 25 μm with sufficient strength was obtained based on Example 6 except that 50 g of the aromatic polyester powder obtained in Example 2 was used instead of using the aromatic polyester powder obtained in Example 1.

Example 8

An aromatic-polyester film having a film thickness of 25 μm with sufficient strength was obtained based on Example 6 except that 50 g of the aromatic polyester powder obtained in Example 3 was used instead of using the aromatic polyester powder obtained in Example 1.

Example 9

An aromatic-polyester film having a film thickness of 25 μm with sufficient strength was obtained based on Example 6 except that 50 g of the aromatic polyester powder obtained in Example 4 was used instead of using the aromatic polyester powder obtained in Example 1.

Example 10

An aromatic-polyester film having a film thickness of 25 μm with sufficient strength was obtained based on Example 6 except that 50 g of the aromatic polyester powder obtained in Example 5 was used instead of using the aromatic polyester powder obtained in Example 1.

Comparative Example 1

An aromatic-polyester film having a film thickness of 25 μm with sufficient strength was obtained based on Example 6 except that 50 g of the aromatic polyester powder obtained in Production Example 1 was used instead of using the aromatic polyester powder obtained in Example 1.

Comparative Example 2

An aromatic-polyester film having a film thickness of 25 μm with sufficient strength was obtained based on Example 6 except that 50 g of the aromatic polyester powder obtained in Production Example 2 was used instead of using the aromatic polyester powder obtained in Example 1.

Comparative Example 3

An aromatic-polyester film having a film thickness of 25 μm with sufficient strength was obtained based on Example 6 except that 50 g of the aromatic polyester powder obtained in Production Example 3 was used instead of using the aromatic polyester powder obtained in Example 1.

Comparative Example 4

An aromatic-polyester film having a film thickness of 25 μm with sufficient strength was obtained based on Example 6 except that 50 g of the aromatic polyester powder obtained in Production Example 4 was used instead of using the aromatic polyester powder obtained in Example 1.

The following evaluation tests were performed on the aromatic-polyester film (Examples 6 to 10 and Comparative Examples 1 to 4) obtained as described above.

1. Thermal Conductivity

The thermal conductivity (unit: W/(m·K)) was calculated by determining the thermal diffusivity (unit: m$^2$/s), specific heat (unit: J/(kg·K)), and density (unit: kg/nm$^3$) by the following method, and calculating the following equation.

$$\text{Thermal conductivity} = \text{thermal diffusivity} \times \text{specific heat} \times \text{density}$$

Here, the thermal conductivity was measured at room temperature (for example, 23° C.) by the temperature wave thermal analysis method for each of the aromatic-polyester films described above. As a measuring apparatus, ai-Phase Mobile manufactured by ai-Phase Co., Ltd., was used.

The specific heat was measured using a differential scanning calorimeter (DSC) in comparison with a sapphire reference substance.

In addition, the density was also measured using the Archimedes method.

2. Tensile Characteristics

Tensile strength and tensile elongation at break were measured according to JIS K 7127. Using a tensile tester, pulling was carried out at a speed of 5 mm/min and the strength (value obtained by dividing the tensile load value by the cross-sectional area of the test piece) and the elongation when the sample was cut (ruptured) were determined. The tensile elongation is calculated by the following formula. The greater the tensile elongation, the greater the film elongation.

Elongation (%)=(L−Lo)/Lo

Lo: Sample length (mm) before testing, L: Sample length at break (mm)

The results of these evaluation tests are shown in Table 1.

TABLE 1

| | Composition (mol) | | | | | Thermal Conductivity (W/(m·K)) | Tensile Elongation at Break (%) |
|---|---|---|---|---|---|---|---|
| | HNA | POB | APAP | HQ | IPA | | |
| Example 6 | 0 | 1.8 | 3.1 | 1.0 | 4.1 | 0.31 | 26.4 |
| Example 7 | 0 | 1.6 | 3.2 | 1.0 | 4.2 | 0.30 | 22.0 |
| Example 8 | 0 | 1.8 | 2.9 | 1.2 | 4.1 | 0.29 | 27.5 |
| Example 9 | 0 | 1.6 | 3.0 | 1.2 | 4.2 | 0.29 | 24.8 |
| Example 10 | 0 | 1.7 | 3.15 | 1.0 | 4.15 | 0.30 | 22.3 |
| Comparative Example 1 | 2.0 | 0 | 4.0 | 0 | 4.0 | 0.27 | 18.5 |
| Comparative Example 2 | 1.5 | 0 | 4.25 | 0 | 4.25 | 0.30 | 13.0 |
| Comparative Example 3 | 0 | 2.0 | 2.5 | 1.5 | 4.0 | 0.26 | 16.2 |
| Comparative Example 4 | 0 | 1.8 | 2.4 | 1.7 | 4.1 | 0.23 | 21.8 |

As shown in Table 1, the aromatic-polyester film of Example 6 had a high thermal conductivity of 0.31 W/(m·K) and a tensile elongation at break of 26.4%, which was a good result.

As shown in Table 1, the aromatic-polyester film of Example 7 had a high thermal conductivity of 0.30 W/(m·K) and a tensile elongation at break of 22.0%, which was a good result.

As shown in Table 1, the aromatic-polyester film of Example 8 had a high thermal conductivity of 0.29 W/(m·K) and a tensile elongation at break of 27.5%, which was a good result.

As shown in Table 1, the aromatic-polyester film of Example 9 had a high thermal conductivity of 0.29 W/(m·K) and a tensile elongation at break of 24.8%, which was a good result.

As shown in Table 1, the aromatic-polyester film of Example 10 had a high thermal conductivity of 0.30 W/(m·K) and a tensile elongation at break of 22.3%, which was a good result.

The aromatic-polyester film of Comparative Example 1 had a thermal conductivity of 0.27 W/(m·K), which was a lower value compared to Examples 6 to 10. The tensile elongation at break was 18.5%, which was lower than in Examples 6 to 10 and under 20%.

The aromatic-polyester film of Comparative Example 2 had a thermal conductivity of 0.30 W/(m·K) equivalent to in Examples 6 to 10, but the tensile elongation at break was 13.0%, which was lower than Examples 6 to 10 and under 20%.

The aromatic-polyester film of Comparative Example 3 had a thermal conductivity of 0.26 W/(m·K), which was a lower value compared to Examples 6 to 10. The tensile elongation at break was 16.2%, which was lower than those of Examples 6 to 10 and lower than 20%.

In the aromatic-polyester film of Comparative Example 4, the tensile elongation at break was 21.8%, which was equivalent to in Examples 6 to 10, but the thermal conductivity was 0.23 W/(m·K) and was a lower value compared to Examples 6 to 10.

As shown in the above evaluation results, according to these Examples, it was possible to obtain an aromatic-polyester film having a high thermal conductivity and long film elongation.

INDUSTRIAL APPLICABILITY

According to the present invention, it is possible to provide an aromatic polyester capable of forming a film excellent in film elongation and thermal conductivity, a liquid aromatic-polyester composition using the aromatic polyester, a process for producing an aromatic-polyester film, and an aromatic-polyester film, which is extremely useful industrially.

REFERENCE SIGNS LIST 1 aromatic-polyester film

The invention claimed is:

1. An aromatic polyester, comprising:
as constituent units,
a repeating unit (A) represented by Formula (a) below;
a repeating unit (B) derived from an aromatic dicarboxylic acid;
a repeating unit (C) derived from an aromatic amine selected from the group consisting of aromatic diamines and aromatic amines having a hydroxyl group; and
a repeating unit (D) derived from an aromatic diol;
wherein a content of the repeating unit (A) is 16 mol% or more and 18 mol% or less, a content of the repeating unit (B) is 41 mol % or more and 42 mol % or less, a total content of the repeating unit (C) and the repeating unit (D) is 41 mol % or more and 42 mol % or less, a content of the repeating unit (C) is 29 mol % or more and 32 mol % or less, and a content of the repeating unit (D) is 10 mol % or more and 12 mol % or less with respect to a total of the repeating units (A) to (D);

$$—O—Ar^1—CO— \quad (a),$$

wherein $Ar^1$ represents a 1,4-phenylene group, a 2,6-naphthylene group, or a 4,4'-biphenylene group; and at least one hydrogen atom of the group represented by $Ar^1$ is optionally independently substituted with a halogen atom, an alkyl group, or an aryl group,
wherein the repeating unit (B) is a repeating unit represented by Formula (b) below $$—CO—Ar^2—CO— \quad (b),$$

wherein $Ar^2$ represents a 1,4-phenylene group, a 1,3-phenylene group, a 2,6-naphthylene group, or a diphenyl ether-4,4'-diyl group; and at least one hydrogen atom of the group represented by $Ar^2$ is optionally independently substituted with a halogen atom, an alkyl group, or an aryl group, wherein the repeating unit (C) is a repeating unit represented by Formula (c) below —X—Ar³—NH—         (c), wherein Ar³ represents a 1,4-phenylene group, a 1,3-phenylene group, or a 2,6- naphthylene group; at least one hydrogen atom of the group represented by Ar³ is optionally independently substituted with a halogen atom, an alkyl group, or an aryl group; and X represents —O— or —NH—, and wherein the repeating unit (D) is a repeating unit represented by Formula (d) below —O—Ar⁴—O—         (d), wherein Ar⁴ represents a 1,4-phenylene group, a 1,3-phenylene group, or a 4,4'-biphenylene group; and at least one hydrogen atom of the group represented by Ar⁴ is optionally independently substituted with a halogen atom, an alkyl group, or an aryl group.

2. The aromatic polyester according to claim 1, wherein Ar¹ in Formula (a) is a 1,4-phenylene group or a 2,6-naphthylene group.

3. The aromatic polyester according to claim 1, wherein Ar² in Formula (b) is a 1,4-phenylene group, a 1,3-phenylene group, or a 2,6-naphthylene group.

4. The aromatic polyester according to claim 1, wherein Ar³ in Formula (c) is an unsubstituted 1,4-phenylene group, an unsubstituted 1,3-phenylene group, or an unsubstituted 2,6-naphthylene group.

5. The aromatic polyester according to claim 1, wherein Ar⁴ in Formula (d) is an unsubstituted 1,4-phenylene group, an unsubstituted 1,3-phenylene group, or an unsubstituted 4,4'-biphenylene group.

6. An aromatic-polyester film, comprising: the aromatic polyester according to claim 1.

7. A liquid aromatic-polyester composition, comprising: the aromatic polyester according to claim 1; and an aprotic solvent.

8. The liquid aromatic-polyester composition according to claim 7, wherein the aromatic polyester is contained in an amount of 0.01 parts by mass or more and 100 parts by mass or less with respect to 100 parts by mass of the aprotic solvent.

9. The liquid aromatic-polyester composition according to claim 7, wherein the aprotic solvent is an aprotic solvent not including a halogen atom.

10. The liquid aromatic-polyester composition according to claim 7, wherein the aprotic solvent has a dipole moment of 3 or more and 5 or less.

11. A process for producing an aromatic-polyester film, comprising:
a step of casting the liquid aromatic-polyester composition according to claim 7 onto a support substrate; and
a step of removing a solvent from the liquid aromatic-polyester composition on the support substrate.

12. The aromatic polyester according to claim 1, wherein Ar¹ in Formula (a) is a 1,4-phenylene group or a 2,6-naphthylene group,
Ar² in Formula (b) is a 1,3-phenylene group,
Ar³ in Formula (c) represents a 1,4-phenylene group, and X represents —O—, and
wherein
Ar⁴ in Formula (d) represents a 1,4-phenylene group.

13. The aromatic polyester according to claim 12, wherein Ar¹ is a 1,4-phenylene group.

* * * * *